Dec. 22, 1925.                                          1,566,838
J. T. DE MAROIS
AUTOMOBILE SAWING MACHINE
Filed Dec. 4, 1924
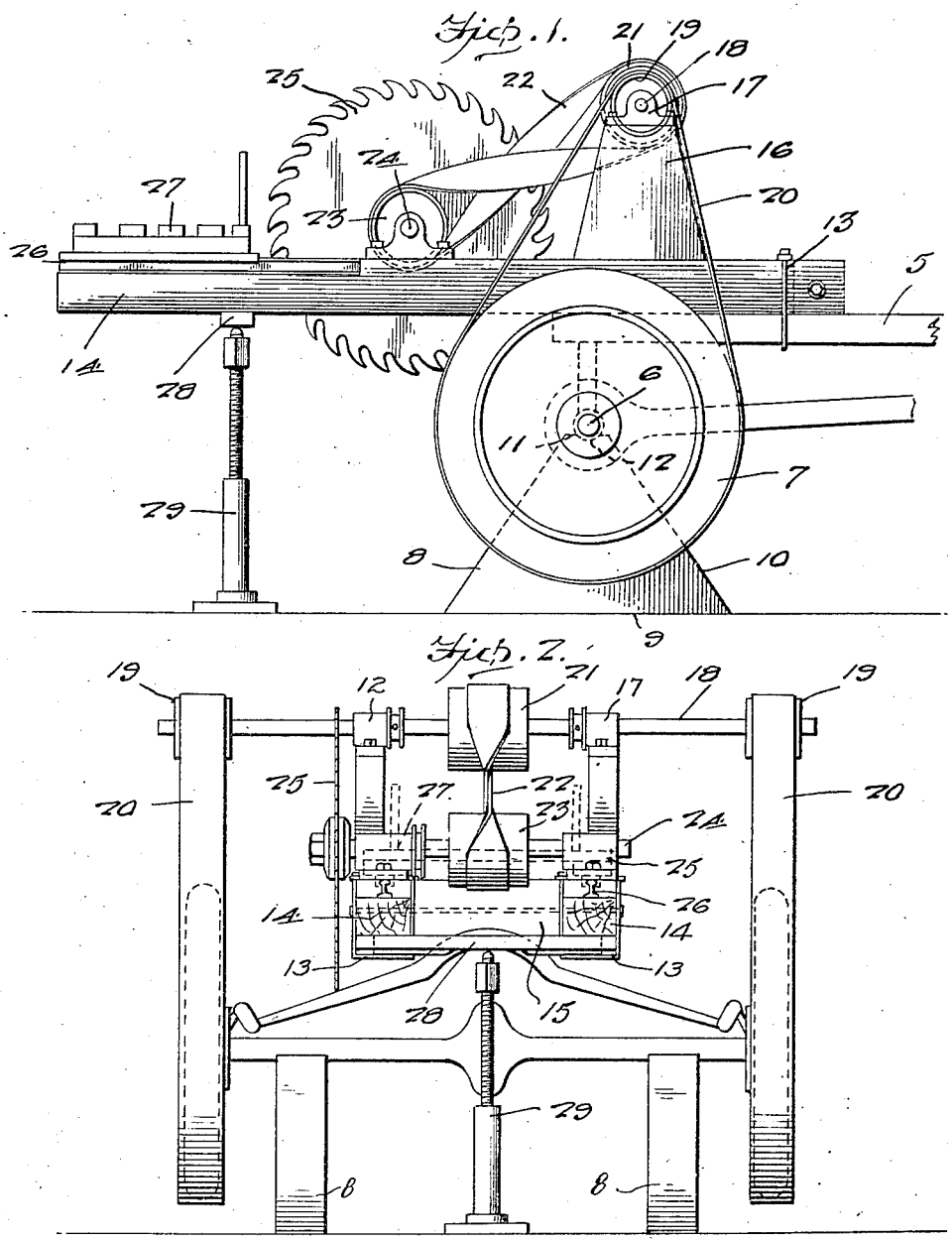
Inventor
J. T. De Marois
By Fetherstonhaugh & Co
Attorney Patented Dec. 22, 1925.

1,566,833

UNITED STATES PATENT OFFICE.

JOSEPH TOUPHIL DE MAROIS, OF ANACONDA, MONTANA.

AUTOMOBILE SAWING MACHINE.

Application filed December 4, 1924. Serial No. 753,955.

*To all whom it may concern:*

Be it known that JOSEPH TOUPHIL DE MAROIS, citizen of the United States, residing at Anaconda, in the county of Deerlodge and State of Montana, has invented certain new and useful Improvements in Automobile Sawing Machines, of which the following is a specification, reference being had therein to the accompanying drawing.

The purpose of this invention is to provide a wood sawing machine capable of being readily attached to the chassis of an automobile and adapted to be connected directly to the rear wheels of the latter so as to be driven thereby.

The invention consists in certain novel details of construction, combination and arrangement of parts as more particularly disclosed in the following detailed description and accompanying drawings.

Figure 1, is a side view of the invention and

Figure 2 is a rear end view of the construction illustrated in Figure 1.

Referring more particularly to the drawings, 5 designates the chassis of an automobile of conventional design, 6 the rear axle and 7 the rear wheels mounted thereon.

According to my invention the aforementioned axle and wheels are sustained in elevated position by means of suitable supports 8. Each of these supports is in the form of a block having a relatively wide base 9 and inclined sides 10 converging toward the top 11 which is formed with a curved depression 12 affording a seat for the axle 6.

Secured on the chassis, as indicated at 13, and projecting rearwardly therefrom is a frame consisting of a pair of side bars 14 connected together by any suitable number of cross bars 15. Above the axle 6 the frame is provided with a pair of vertical standards 16 carrying suitable bearings 17 in which is journaled a cross shaft 18. Fixed to the ends of this shaft are a pair of pulleys 19 positioned above and in line with the rear wheels 7 and connected thereto by suitable driving belts 20. A pulley 21, fixed to the central portion of shaft 18, is connected by belt 22 to a corresponding pulley 23 fixed to a second cross shaft 24 which is journaled in suitable bearings 25 carried by side members 14. This shaft 24 carries the rotary saw 25 which may be of any suitable construction. Beyond the saw blade 25 the members 14 support a pair of track rails 26 which serve to support and guide the movable saw table 27.

Directly below the track rails 26 the side members 14 of the frame are connected together by the cross bar 28 which is adapted to rest upon the upper member of a portable telescopic screw jack 29 whereby the projecting end of said frame is given suitable support independently of the fastening 13.

From the foregoing it will be seen that I have provided a very simple and efficient wood sawing attachment capable of being applied to any standard type of automobile so as to be driven from the rear axle through the instrumentality of the rear wheels.

With my invention I avoid the necessity of removing the rear wheels to substitute special forms of driving pulleys as heretofore proposed. This is due to the fact that, in my invention, the arrangement of the cross shaft 18 and the pulley 19 is such as to enable the latter to be belted directly to the rear wheels which are supported in elevated position by the blocks 18.

Having thus fully disclosed my invention it will be understood that while I have described what I now consider to be a preferred embodiment, various changes may be resorted to within the scope and spirit of the appended claims.

What I claim as new is:—

1. A tool attachment for automobiles comprising a frame designed to be supported at one end upon the side members of an automobile chassis, spaced bearings positioned intermediate the length of the frame and carried by the side members thereof, a shaft journalled in said bearings, a rotary tool fixed to an end of said shaft and disposed at one side of the frame, a pulley fixed to an intermediate portion of the shaft, a pair of upright standards carried by the side members of the frame between said shaft and that end of the frame which is adapted to be supported upon the chassis, an elevated shaft journalled in bearings carried by the upper ends of said standards, pulleys fixed to the ends of said elevated shaft outwardly of said standards and adapted to be belted directly to the rear wheels of the automobile, an intermediate pulley carried by said elevated shaft and a belt connecting said last mentioned pulley to the pulley on the tool carrying shaft.

2. A tool attachment as recited in claim 1 including track rails carried by the side members of the frame and extending from the bearings carrying the tool shaft to the end of the frame opposite that adapted to be attached to the chassis and a work table mounted to slide on said track rails.

In testimony whereof I hereunto affix my signature.

JOSEPH TOUPHIL DE MAROIS.